US011613700B2

(12) United States Patent
Lim et al.

(10) Patent No.: US 11,613,700 B2
(45) Date of Patent: Mar. 28, 2023

(54) HIGHLY EMISSIVE SHORT WAVE INFRARED NANOPARTICLES AND METHOD FOR PREPARING THE SAME

(71) Applicant: DAEGU GYEONGBUK INSTITUTE OF SCIENCE AND TECHNOLOGY (DGIST), Daegu (KR)

(72) Inventors: Sung Jun Lim, Daegu (KR); Gyu Dong Lee, Daegu (KR); Woo Hyeon Jeong, Namyangju-si (KR)

(73) Assignee: DAEGU GYEONGBUK INSTITUTE OF SCIENCE AND TECHNOLOGY (DGIST), Daegu (KR)

( * ) Notice: Subject to any disclaimer, the term of this patent is extended or adjusted under 35 U.S.C. 154(b) by 232 days.

(21) Appl. No.: 16/824,897

(22) Filed: Mar. 20, 2020

(65) Prior Publication Data
US 2020/0299576 A1    Sep. 24, 2020

(30) Foreign Application Priority Data

Mar. 22, 2019    (KR) .......................... 10-2019-0032919

(51) Int. Cl.
*C09K 11/89*    (2006.01)
*B82Y 40/00*    (2011.01)
*B82Y 20/00*    (2011.01)

(52) U.S. Cl.
CPC .............. *C09K 11/892* (2013.01); *B82Y 20/00* (2013.01); *B82Y 40/00* (2013.01)

(58) Field of Classification Search
CPC .................................................. C09K 11/892
See application file for complete search history.

(56) References Cited

U.S. PATENT DOCUMENTS 7,867,557 B2 * 1/2011 Pickett ................. C09K 11/883
428/404
2008/0302418 A1 * 12/2008 Buller ............. H01L 31/035281
136/265

FOREIGN PATENT DOCUMENTS

| JP | 2007-077010 A | 3/2007 |
| JP | 5151993 B2 | 2/2013 |
| KR | 10-2008-0046158 A | 5/2008 |

(Continued)

OTHER PUBLICATIONS

Bryant et al, "Tight0binding theory of quantum-dot quantum wells: Single-particle effects and near-edge-band structure", Phys Rev B, 67(20), 205320 (2003), pp. 205320-1 to 205320-17, 05/27/30.*

(Continued)

*Primary Examiner* — C Melissa Koslow
(74) *Attorney, Agent, or Firm* — Harness, Dickey & Pierce, P.L.C.

(57) ABSTRACT

The present invention provides shortwave infrared ray emitting nanoparticles including a core having band gap energy of $E_1$; an intermediate layer that is formed on the core and has band gap energy of $E_2$; and an outer layer that is formed on the intermediate layer and has band gap energy of $E_3$, in which the size of the $E_2$ is smaller than the size of the E1 and the size of the $E_3$. According to the present invention, it is possible to provide a solar cell which is improved in efficiency and life span and can be produced by a solution process.

9 Claims, 9 Drawing Sheets
(5 of 9 Drawing Sheet(s) Filed in Color)

(56) References Cited

FOREIGN PATENT DOCUMENTS

KR         10-0841186 B1     6/2008
KR   10-2018-0108134 A   10/2018

OTHER PUBLICATIONS

D. J. Naczynski, et al. "Rare-earth doped biological composites as in vivo shortwave infrared reporters," Nature Communications, pp. 1-10 (2013).

* cited by examiner

HIGHLY EMISSIVE SHORT WAVE INFRARED NANOPARTICLES AND METHOD FOR PREPARING THE SAME

BACKGROUND OF THE INVENTION

Field of the Invention

The present invention relates to highly luminescent shortwave infrared nanoparticles and a method for producing the same.

Description of the Related Art

Recently, research and development have been actively conducted to apply a shortwave infrared (SWIR; wavelength of 1,000 to 1,700 nm) nano luminous body to non-invasive bioimaging, communication or control LED, and the like.

As nanomaterials emitting light in the shortwave infrared region, only a significantly small number of nanomaterials such as nanoparticles doped with lanthanide ions which exhibit shortwave infrared luminescence, semiconductor nanoparticles such as PbS, InAs, $Ag_2S$, and HgCdTe, and carbon nanotubes have been reported.

Among these, lanthanide-doped nanoparticles have a problem that the emission wavelength cannot be freely controlled and there is limitation in improvement of brightness due to a low extinction coefficient, and organic light emitting bodies such as carbon nanotubes have a problem that the luminescence quantum efficiency is a few percent or less to be significantly low.

Meanwhile, the great part of semiconductor nanoparticles is composed of quantum dots having a nucleus/shell structure in which a nuclear surface formed of a semiconductor material having the smallest band gap is coated with a semiconductor material having a greater band gap and higher chemical stability. Semiconductor nanoparticles have advantages that the emission wavelength can be freely controlled and that the quantum efficiency in the emission region between 1,000 and 1,700 nm is also higher as compared to other materials (for example, HgCdTe <30%, PbS <60%, $Ag_2S$ <10%).

However, these technologies also have a relatively low quantum efficiency, which limits the penetration depth in biological tissues and have limitation in that the emission spectrum is wide and it is difficult to control the emission wavelength band and thus to implement multiplexed imaging. Hence, development of various materials having a far higher quantum efficiency is still required for bioimaging and various applications thereof.

CITATION LIST

Non Patent Literature

Non Patent Literature 1: D. J. Naczynski, et al., "Rare-earth-doped biological composites as in vivo shortwave infrared reporters", NATURE COMMUNICATIONS, 2013, 4:2199

SUMMARY OF THE INVENTION

A technical object to be achieved by the present invention is to provide shortwave infrared ray emitting nanoparticles having a high extinction coefficient and a high quantum efficiency and a method for producing the same.

The technical object to be achieved by the present invention is not limited to the technical objects mentioned above, and other technical objects not mentioned will be clearly understood by those skilled in the art from the following description.

In order to achieve the technical objects, an aspect of the present invention provides shortwave infrared ray emitting nanoparticles including a core having band gap energy of $E_1$; an intermediate layer that is formed on the core and has band gap energy of $E_2$; and an outer layer that is formed on the intermediate layer and has band gap energy of $E_3$, in which a size of the $E_2$ is smaller than a size of the $E_1$ and a size of the $E_3$.

According to an embodiment of the present invention, a size of the $E_1$ may be smaller than a size of the $E_3$.

According to an embodiment of the present invention, the core may contain CdSe, HgCdSe, CdS, HgCdS, or any combination thereof.

According to an embodiment of the present invention, the intermediate layer may contain HgS, HgSe, HgSeS, or any combination thereof.

According to an embodiment of the present invention, the outer layer may contain CdS, CdZnS, ZnS, or any combination thereof.

According to an embodiment of the present invention, a thickness of the intermediate layer may be 0.3 nm to 1.2 nm.

According to an embodiment of the present invention, an emission wavelength of the nanoparticles may be adjusted by changing a composition of the intermediate layer, a thickness of the intermediate layer, and combination of the composition and the thickness.

According to an embodiment of the present invention, the outer layer may include one or more layers.

Another aspect of the present invention provides a method for producing shortwave infrared nanoparticles, the method including (a) synthesizing a core having band gap energy of $E_1$; (b) forming an intermediate layer having band gap energy of $E_2$ on the core; and (c) forming an outer layer having band gap energy of $E_3$ on the intermediate layer, in which a size of the $E_2$ is smaller than a size of the $E_1$ and a size of the $E_3$.

According to an embodiment of the present invention, the method may further include performing separation and purification after any one or more of the steps (a) to (c).

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE PREFERRED EMBODIMENTS

Hereinafter, the present invention will be described with reference to the accompanying drawings. However, the present invention may be implemented in various different forms and thus is not limited to the embodiments described herein.

Throughout the specification, when a part is said to be "connected (linked, contacted, coupled)" with another part, this includes not only a case of being "directly connected" but also a case of being "indirectly connected" with another member interposed therebetween. In addition, when a part is said to "include" a certain component, this means that the part may be further provided with other components rather than excluding other components unless specifically stated otherwise.

The terms used in the present specification are only used to describe specific embodiments and are not intended to limit the present invention. Singular expressions include plural expressions unless the context clearly indicates otherwise. It should be understood that the terms "include" or "have" in the present specification are intended to indicate that there are features, numbers, steps, operations, components, parts, or combinations thereof described in the specification but do not preclude the existence or addition possibility of one or more other features or numbers, steps, operations, components, parts, or combinations thereof.

An aspect of the present invention provides nanoparticles which are a luminous body emitting shortwave infrared rays at a high efficiency.

Figure 1:
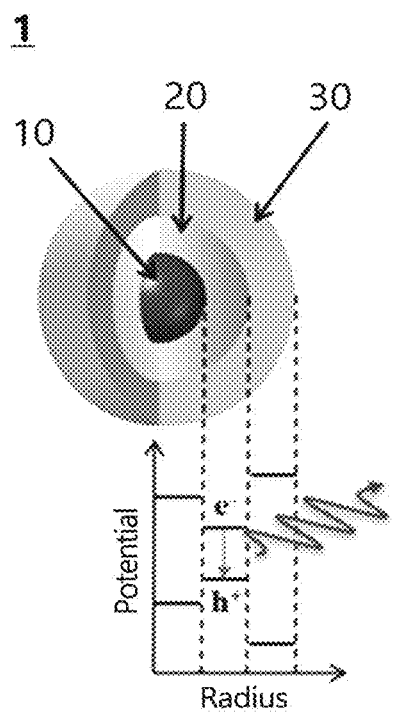
FIG. 1 illustrates a schematic diagram of a cross section of a nanoparticle according to an embodiment of the present invention and a conceptual diagram of shortwave infrared emission depending on the difference in band gap between the respective layers.

Referring to FIG. 1, a nanoparticle 1 includes a core 10, an intermediate layer 20, and an outer layer 30.

The core 10 is located at the innermost layer of the nanoparticle 1 and is used as a support material for introducing the intermediate layer 20 to serve as a supporting core. As materials forming the core 10, a variety of semiconductor nanoparticles having greater band gap energy than the intermediate layer 20 may be used. The core 10 may be, for example, $Hg_xCd_{1-x}Se_yS_{1-y}$ (where 0≤x, y≤1), may contain, for example, CdSe, HgCdSe, CdS, HgCdS, or any combination thereof, and may be, for example, HgCdSe, but is not limited thereto. The material forming the core 10 may have band gap energy of $E_1$.

The radius of the core 10 may be 0.5 nm to 10 nm, for example, 1 nm to 5 nm.

The intermediate layer 20 is formed on the core 10 and may serve as an emitting layer.

Light emission from the intermediate layer 20 may occur through the following procedure: (i) when energy is supplied from the outside to the nanoparticle 1, (ii) an electron-hole pair (exciton) is formed inside the nanoparticle 1, (iii) the formed electron-hole pair moves to the intermediate layer 20 having a low energy level, and (iv) recombination between electron-hole pairs in the intermediate layer 20 causes the nanoparticle 1 to emit light.

The intermediate layer 20 may be formed of a material having band gap energy in the shortwave infrared region. The intermediate layer 20 may be, for example, $HgSe_yS_{1-y}$ (where 0≤y≤1), may contain, for example, HgS, HgSe, HgSeS, or any combination thereof, may be, for example, HgS, but is not limited thereto.

The material forming the intermediate layer 20 may have band gap energy of $E_2$. For example, the band gap energy $E_2$ of the material forming the intermediate layer 20 may be 0.7 to 1.2 eV. The band gap energy corresponds to an emission wavelength of about 1,000 to 1,700 nm.

The thickness of the intermediate layer 20 may be 0.3 nm to 1.2 nm. Considering that the thickness of monolayer is 0.3 nm, the intermediate layer 20 may be formed as one monolayer to four monolayers. When the thickness of the intermediate layer 20 is less than 0.3 nm, the monolayer of semiconductor material cannot be formed and a stable structure cannot be thus formed. When the thickness is more than 1.2 nm, problems in crystallinity, uniformity and the like inside the intermediate layer may occur, resulting in an extremely low luminous efficiency.

The luminescence properties of the nanoparticle 1, for example, the emission wavelength in the shortwave infrared region, can be adjusted in the entire shortwave infrared region of 1,000 nm to 1,700 nm by changing the composition and/or thickness of the intermediate layer 20. In addition, the emission wavelength in the shortwave infrared region of the nanoparticle 1 can be adjusted by adjusting the composition and/or thickness of the intermediate layer 20 so that light in a wavelength band having a longer wavelength than the wavelength region of shortwave infrared rays, namely, mid-infrared rays are emitted.

For example, as the thickness of the intermediate layer 20 increases, the quantum confinement effect becomes weaker and the emission wavelength thus moves in the longer wavelength direction. As the thickness of the intermediate layer 20 decreases, the quantum confinement effect becomes stronger and the emission wavelength thus moves in the short wavelength direction. It is possible to control the emission wavelength in the shortwave infrared region by utilizing this principle.

Meanwhile, in a case in which the content ratio of a material having smaller bulk band gap energy increases among the materials forming the intermediate layer 20, the emission wavelength moves in the longer wavelength direction and further nanoparticles can also be produced which emit light in a wavelength band having a longer wavelength than the shortwave infrared rays, namely, mid-infrared rays.

The outer layer 30 is formed on the intermediate layer 20 and may serve as a passivation layer. This is due to the fact that the outer layer 30 has bandgap energy greater than the intermediate layer 20 and thus acts as a barrier which prevents charge carriers from escaping from the intermediate layer 20. The outer layer 30 may induce an increase in quantum efficiency by preventing the charge carriers from escaping from the intermediate layer. The outer layer 30 can passivate the light emitting material in the intermediate layer 20 from external factors such as oxidation by being formed of a material which is physically and/or chemically stable, may contain, for example, CdS, CdZnS, ZnS, or any combination thereof, and may be, for example, CdZnS, but is not limited thereto. The material forming the outer layer 30 may have band gap energy of $E_3$.

The thickness of the outer layer 30 may be 0.5 nm to 5 nm, for example, 1 nm to 3 nm.

The outer layer 30 may include one or more layers, for example, one or two layers.

The presence of the outer layer 30 does not affect the change in emission wavelength of the shortwave infrared rays emitted from the intermediate layer 20, rather the effect of increasing the quantum efficiency may be attained by the influence of the outer layer 30.

The interface composition of the materials forming the core 10, the intermediate layer 20, and the outer layer 30 which constitute the nanoparticle 1 is required to be selected so that the lattice mismatch between the materials of the respective layers is minimized for the maximization of quantum efficiency, and materials having band gap energy optimized for light emission and passivation may be used.

The nanoparticle 1 may have a quantum well structure. In other words, the size of the band gap energy $E_2$ of the material forming the intermediate layer 20 may be smaller than the size of the band gap energy $E_1$ of the material forming the core 10 and the band gap energy $E_3$ of the material forming the outer layer 30. Furthermore, the size of the band gap energy $E_1$ of the material forming the core 10 may be smaller than the size of the band gap energy $E_3$ of the material forming the outer layer 30.

The nanoparticle 1 may exert a function as a shortwave infrared ray emitting nanomaterial because of this structure and may exhibit a high quantum efficiency of 60% or more, for example, 70% or more in the shortwave infrared region.

The nanoparticle 1 may be applied to the production of light emitting nanomaterials having a narrow emission spectrum since the size of the band gap energy $E_2$ of the material forming the intermediate layer 20 is relatively small.

Conventional shortwave infrared ray emitting materials have a relatively low quantum efficiency and thus have limitation in the penetration depth in biological tissues. In addition, the emission spectrum is wide and it is difficult to control the emission wavelength band, and thus the implementation of multiplexed imaging is significantly limited.

However, the shortwave infrared ray emitting nanoparticles according to an embodiment of the present invention have a high extinction coefficient and a high quantum efficiency and can be applied to the production of nanomaterials which emit light in various shortwave infrared regions. In addition, multiple bioimaging having a higher depth and a higher resolution as compared to the existing optical imaging methods can be realized by utilizing these nanoparticles. Furthermore, shortwave infrared rays emitted from the shortwave infrared ray emitting nanoparticles according to an embodiment of the present invention are less affected by scatterers in the air and can be thus applied to various fields such as identification friend or foe for military purposes.

Another aspect of the present invention provides a method for producing shortwave infrared nanoparticles, the method including (a) synthesizing a core having band gap energy of $E_1$; (b) forming an intermediate layer having band gap energy of $E_2$ on the core; and (c) forming an outer layer having band gap energy of $E_3$ on the intermediate layer, in which a size of the $E_2$ is smaller than a size of the $E_1$ and a size of the $E_3$.

First, step (a) of synthesizing a core having a bandgap energy of $E_1$ may be performed by a solution process.

As the core, various semiconductor nanoparticles having greater band gap energy than the intermediate layer may be used. The core may be, for example, $Hg_xCd_{1-x}Se_yS_{1-y}$ (where $0 \le x$, $y \le 1$), may contain, for example, CdSe, HgCdSe, CdS, HgCdS, or any combination thereof, and may be, for example, HgCdSe, but is not limited thereto. The material forming the core may have band gap energy of $E_1$.

The solvent used in the solution process may contain an alcohol having 6 to 20 carbon atoms or a saturated or unsaturated hydrocarbon having 6 to 30 carbon atoms.

Next, step (b) of forming an intermediate layer having band gap energy of $E_2$ on the core may be performed by coating the surface of the semiconductor nanoparticles with an emitting layer solution having a shortwave infrared band gap.

The step of forming an intermediate layer may be performed, for example, at 120° C. to 150° C.

Finally, step (c) of forming an outer layer having band gap energy of $E_3$ on the intermediate layer may be performed by coating the intermediate layer with a material having a greater band gap than the material forming the intermediate layer.

For the coating, any coating method may be applied without limitation as long as it is a particle coating method known in the art, and the coating method may include, for example, solution phase chemical treatment, continuous ion layer adsorption.

Hereinafter, nanoparticles according to an embodiment of the present invention will be described in detail with reference to Examples and Comparative Examples. In addition, Examples to be described below is an example to aid the understanding of the present invention, and the scope of the present invention is not limited thereto.

EXAMPLES

Example 1. Preparation of Nanoparticles 1.1. Preparation of Core

CdSe cores having a particle diameter of 3 nm or less were prepared by dissolving 0.2 mmol of cadmium stearate, 0.2 mmol of selenium dioxide, and 0.2 mmol of 1,2-hexadecanediol in 4 ml of 1-octadecene and heating the solution at 230° C. To the cores prepared, 10 ml of chloroform, 15 ml of acetone, and 15 ml of methanol were added, and separation and purification were performed by centrifugation.

Thereafter, 100 nmol of the CdSe cores prepared was added to a mercury stearate solution heated to 60° C. (the amount of mercury stearate was adjusted so that the total cadmium to mercury ratio in the solution was 1:2), and then mercury ions were introduced into the cores through a cation exchange reaction, thereby preparing HgCdSe cores. Thereafter, the HgCdSe cores were separated and purified by centrifugation using 10 ml of chloroform, 10 ml of acetone, and 10 ml of methanol.

1.2. Introduction of intermediate layer

The HgCdSe cores obtained in Example 1.1. were dispersed in 3 ml of a 1-octadecene/oleylamine mixed solution (volume ratio=2:1), a sulfur precursor (0.1 M solution of sulfur powder/1-octadecene) was added thereto in an amount in which the HgS layer of 0.8 monolayer (meaning one layer of HgS crystal, thickness of 0.3 nm or less) was grown while heating the solution at 120° C., and then a mercury precursor (0.1 M solution of mercury acetate/oleyl amine) was added to the mixture.

Thereafter, an intermediate layer having a thickness of 0.3 nm or less was introduced into the core surface while gradually increasing the temperature and additionally adding 0.8 monolayer equivalent of sulfur precursor and mercury precursor, whereby an HgCdSe/HgS phosphor was obtained.

The emission wavelength was examined using the phosphor, and as a result, it has been confirmed that the intermediate layer has an emission wavelength of about 1,300 nm.

1.3. Introduction of Outer Layer

The HgCdSe/HgS phosphor obtained in Example 1.2. was dispersed in 3 ml of a 1-octadecene/oleylamine mixed solution (volume ratio=2:1), 0.8 monolayer equivalent of a sulfur precursor (0.1 M solution of sulfur powder/1-octadecene) was added thereto while heating the solution at 150° C. or higher, and then a cadmium precursor (0.1 M solution of cadmium acetate/oleylamine) was added to the mixture. A CdS passivation layer having a 1.6 monolayer thickness was introduced by repeating the above process. Thereafter, 10 ml of chloroform and 20 ml of acetone were added thereto, and separation and purification were performed by centrifugation to obtain HgCdSe/HgS/CdS nanoparticles.

Example 2. Preparation of Nanoparticles

For additional passivation, the HgCdSe/HgS/CdS nanoparticles obtained in Example 1 were dispersed in 3 ml of a 1-octadecene/oleylamine/trioctylphosphine mixed solution (volume ratio=1.7:0.8:0.5), a zinc precursor (0.1 M solution of zinc diethyldithiocarbamate/dibenzylamine) was added thereto while heating the solution at 120° C. to introduce a ZnS passivation layer. Thereafter, 10 ml of chloroform and 20 ml of acetone were added thereto, and separation and purification were performed by centrifugation to obtain HgCdSe/HgS/CdS/ZnS nanoparticles.

Experimental Example 1. Observation of Nanoparticle Surface

The surface of the HgCdSe/HgS/CdS/ZnS nanoparticles obtained in Example 1 was observed under a transmission electron microscope (TEM).

Figure 2:
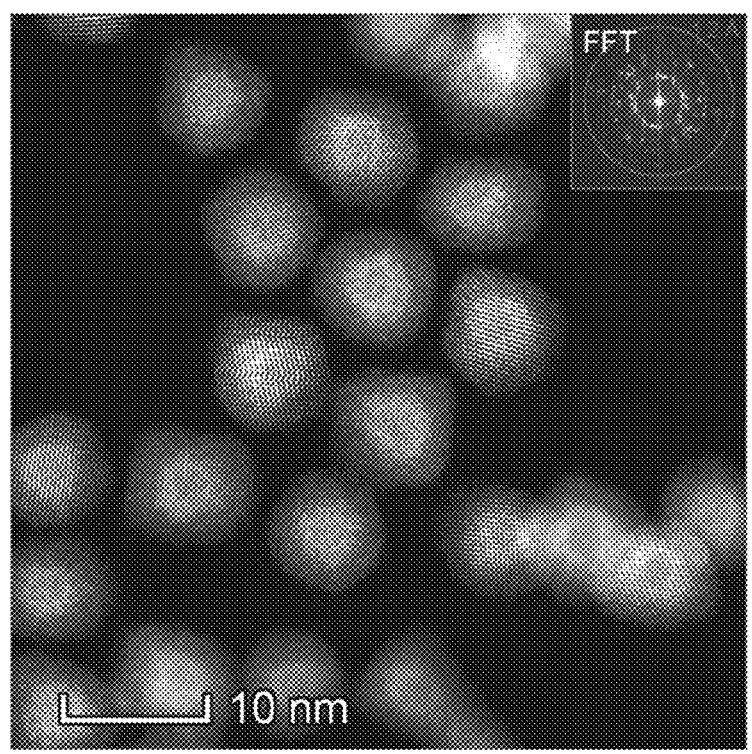
FIG. 2 illustrates a TEM image of nanoparticles according to an embodiment of the present invention.

As a result of the observation, nanoparticles having a spherical core-shell multilayer structure were confirmed (FIG. 2).

Experimental Example 2. Observation of Internal Distribution of Elements in Nanoparticles The HgCdSe/HgS/CdS/ZnS nanoparticles obtained in Example 1 were observed using an energy dispersive spectrometer (EDS) attached to a transmission electron microscope system to examine the internal distribution of the respective elements.

Figure 3A:
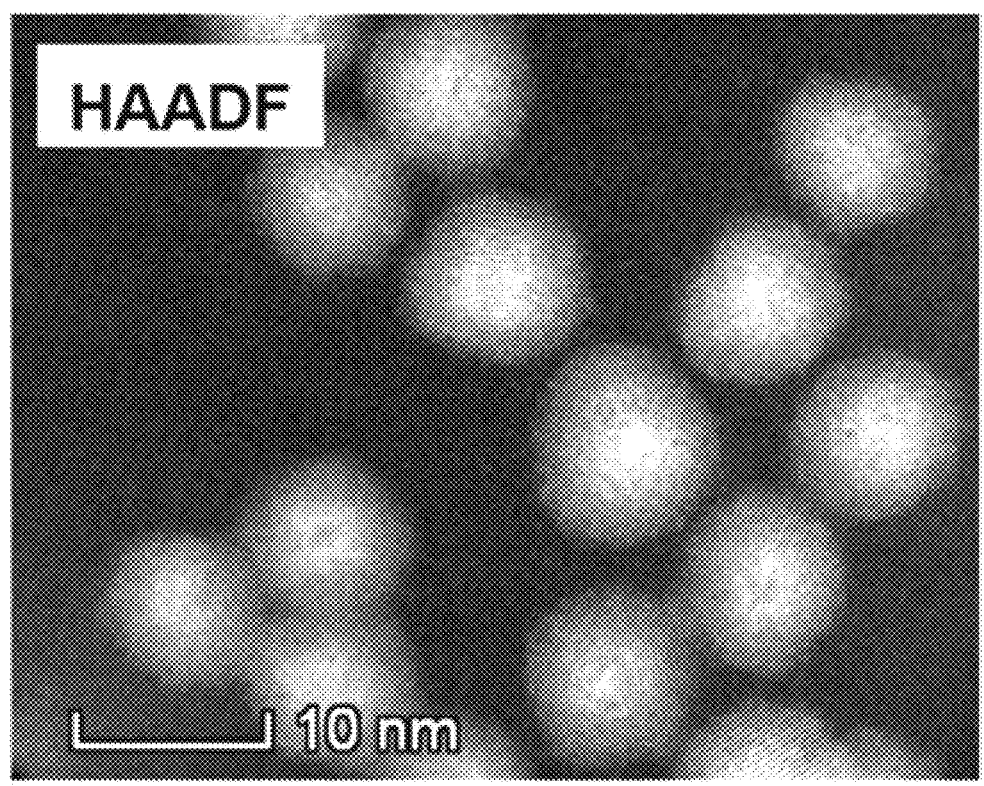
FIGS. 3(a) through 3(h) illustrate EDS mapping images using nanoparticles according to an embodiment of the present invention.
Figure 3B:
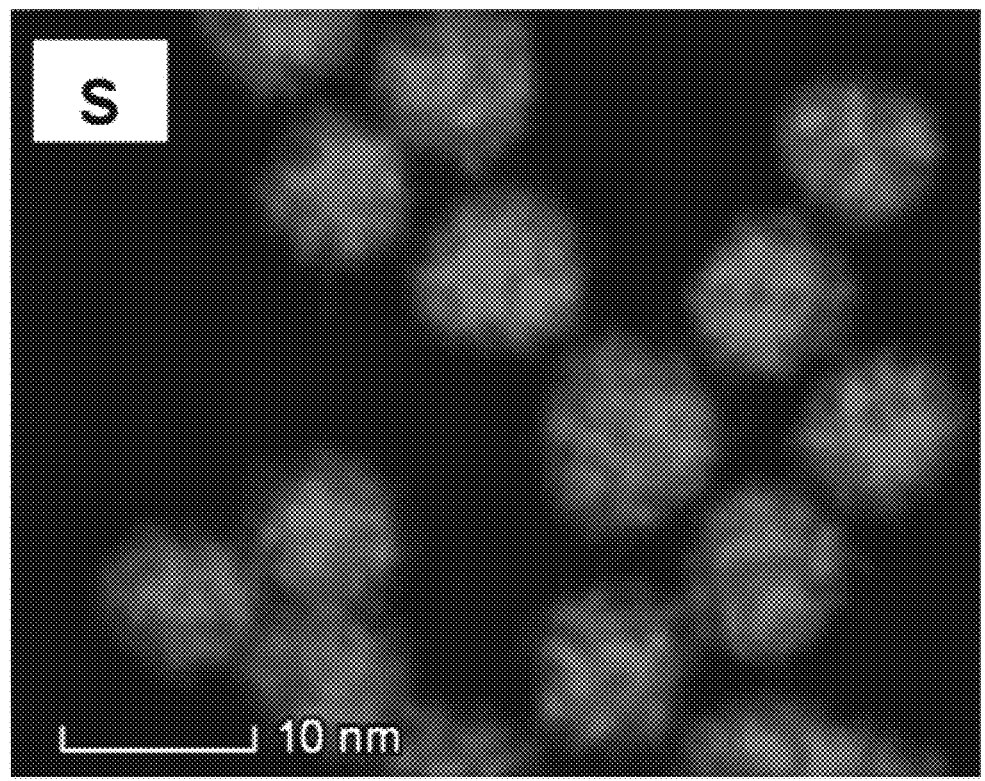
Figure 3C:
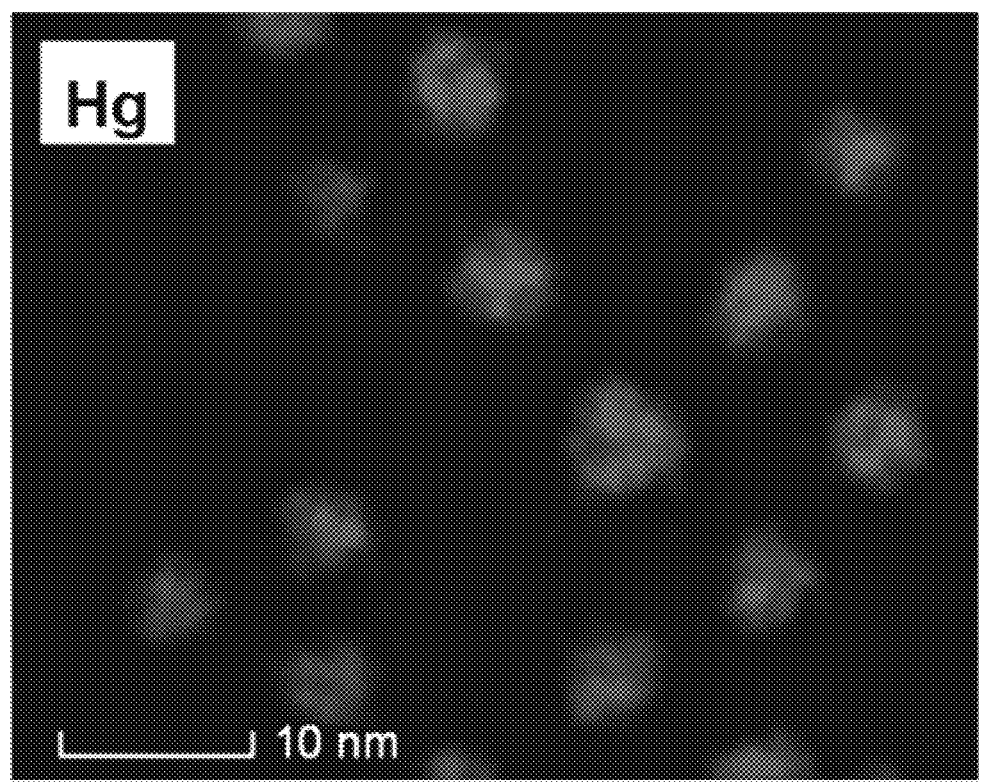
Figure 3D:
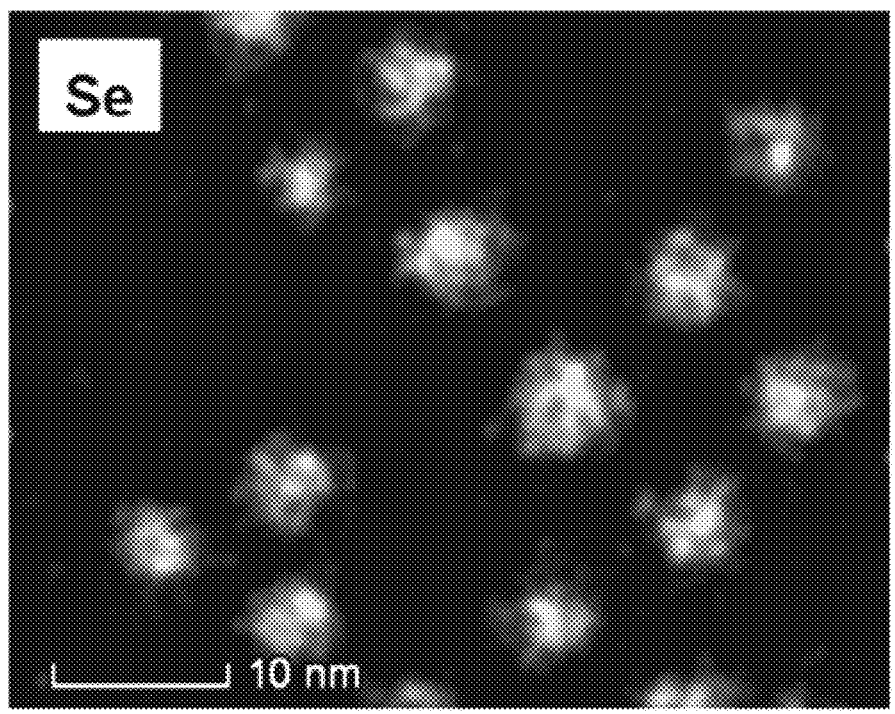
Figure 3E:
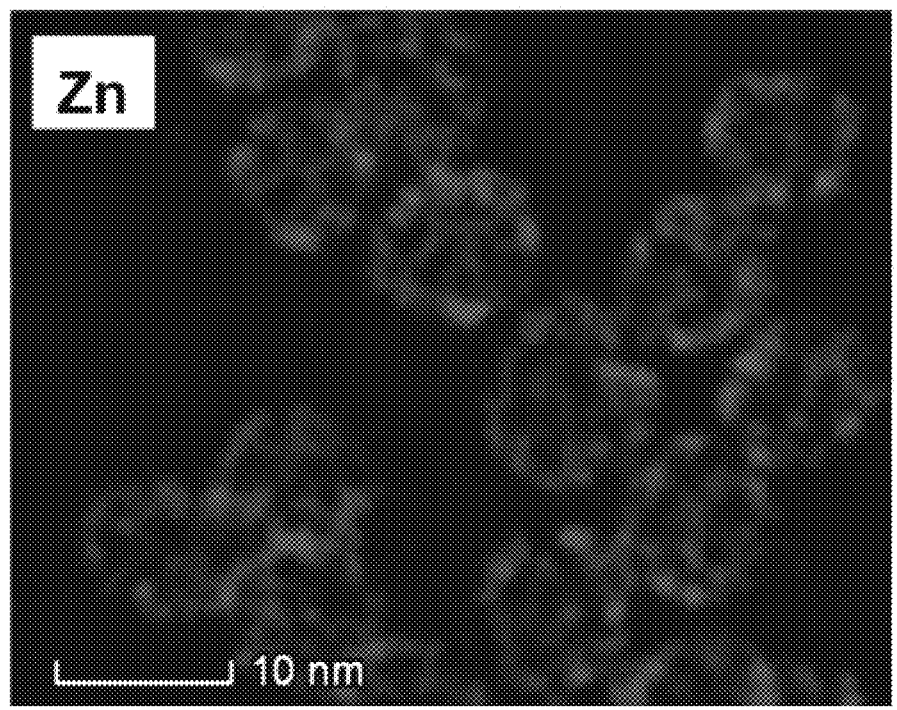
Figure 3F:
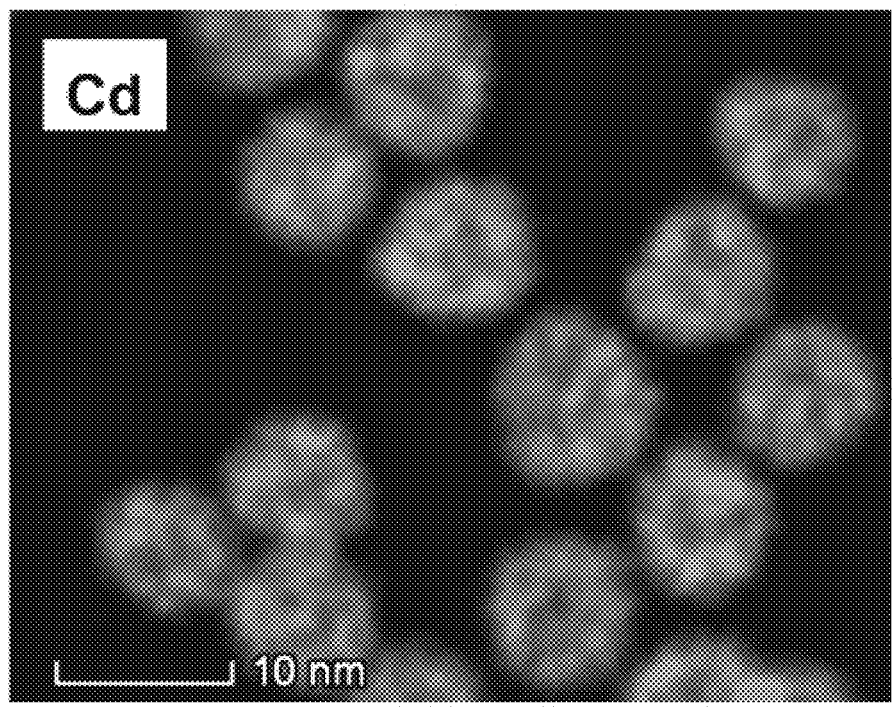
Figure 3G:
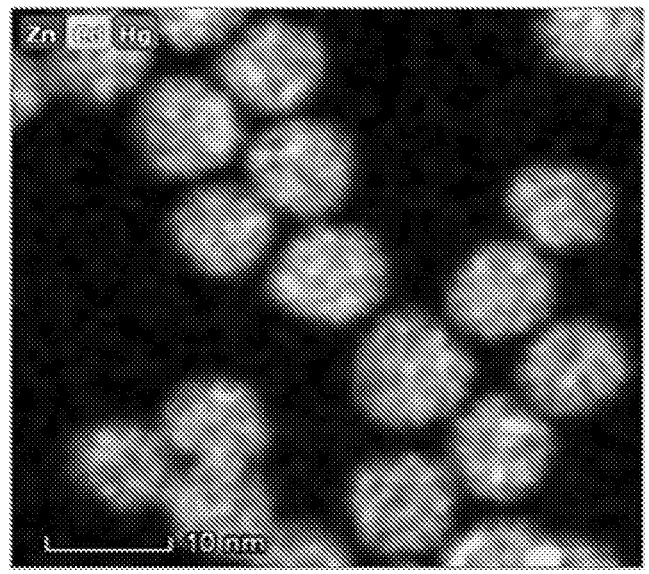
Figure 3H:
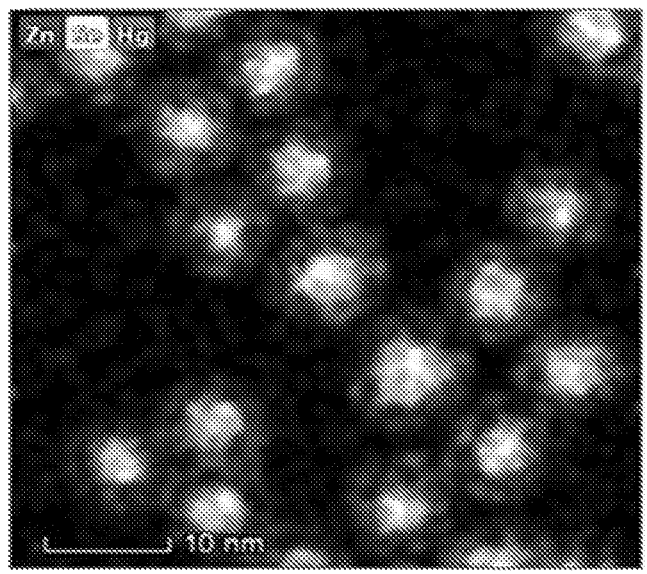

By utilizing this, a dark field image (HADDF phase, white)(FIG. 3(a)), a sulfur (S, pink) image (FIG. 3(b)), a mercury (Hg, red) image (FIG. 3(c)), a selenium (Se, yellow) image (FIG. 3(d)), a zinc (Zn, blue) image (FIG. 3e), a cadmium (Cd, green) image (FIG. 3(f)), a zinc-cadmium-mercury multiple image (FIG. 3(g)), and a zinc-selenium-mercury multiple image (FIG. 3(h)) were acquired.

It has been confirmed that selenium and mercury were present at locations corresponding to the interior such as the core of the nanoparticles with respect to sulfur (S), mercury (Hg), Se (selenium), zinc (Zn), and cadmium (Cd) and sulfur, zinc, and cadmium correspond to the outer layer of the nanoparticles. It has been confirmed that the nanoparticles are composed of three layers through the zinc-cadmium-mercury multiple images and zinc-selenium-mercury multiple images.

Experimental Example 3. Examination of Emission Wavelength and Quantum Yield of Nanoparticles In order to examine the emission wavelength and quantum yield of the nanoparticles according to the present invention, the nanoparticles obtained in Examples 1 and 2 were prepared four by one, and the emission energy from each nanoparticle was observed using a spectrometer (Quantaurus QY Plus Absolute PL QY spectrometer, Hamamatsu, Japan).

Figure 4:
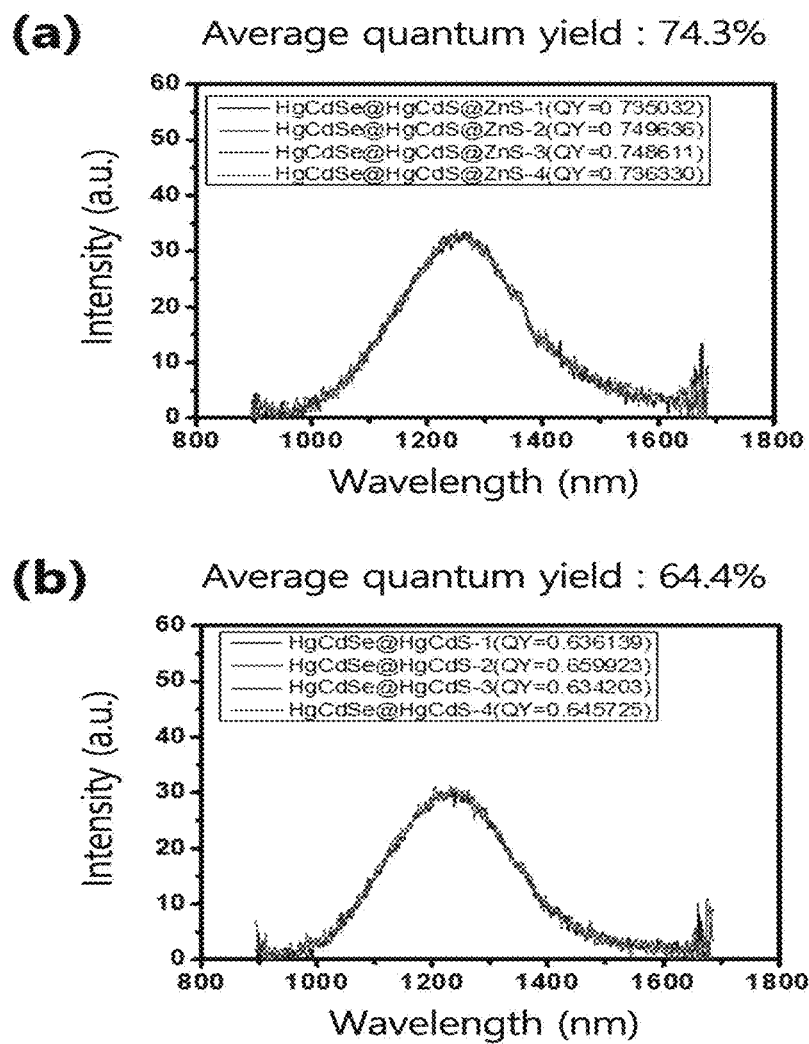
FIGS. 4(a) and 4(b) illustrate the emission wavelength and quantum yield of nanoparticles according to the present invention.

As a result of the observation on emission energy of each nanoparticle, it has been confirmed that the nanoparticles of Example 1 and Example 2 all emit shortwave infrared rays having a wavelength in a range of 1,000 to 1,600 nm. In addition, it has been confirmed that the average quantum yield of the four nanoparticles according to Example 1 was 64.4% to be high and the average quantum yield of the four nanoparticles according to Example 2 was 74.3% to be high (FIG. 4).

In the case of using the nanoparticles according to an embodiment of the present invention, it is possible to provide a nanomaterial that has a high extinction coefficient and a high quantum efficiency and emits light in various shortwave infrared regions. In addition, multiple bioimaging having a higher depth and a higher resolution as compared to the existing optical imaging methods can be realized by utilizing these nanoparticles.

Shortwave infrared rays emitted from the nanoparticles according to an embodiment of the present invention are less affected by scatterers in the air and can be thus applied to various fields such as identification of friend or foe for military purposes.

The above description of the present invention is for illustration only, and those skilled in the art to which the present invention pertains can understand that the present invention can be easily modified into other specific forms without changing its technical spirit or essential features. Therefore, it should be understood that the embodiments described above are illustrative in all respects and not restrictive.

The scope of the present invention is indicated by the following claims, and all modifications or variations derived from the meaning and scope of the claims and their equivalent concepts should be interpreted to be included in the scope of the present invention.

What is claimed is:

1. Shortwave infrared ray emitting nanoparticles comprising:
    a supporting core having band gap energy of $E_1$;
    an intermediate layer on the supporting core and used as an emitting layer, the intermediate layer having band gap energy of $E_2$ in a range of 0.7 eV to 1.2 eV; and
    an outer layer that is formed on the intermediate layer and has band gap energy of $E_3$, wherein
    a size of the $E_2$ is smaller than a size of the $E_1$ and a size of the $E_3$, and
    a thickness of the intermediate layer is 0.3 nm to 1.2 nm.

2. The shortwave infrared ray emitting nanoparticles according to claim 1, wherein a size of the $E_1$ is smaller than a size of $E_3$.

3. The shortwave infrared ray emitting nanoparticles according to claim 1, wherein the supporting core includes CdSe, HgCdSe, CdS, HgCdS, or any combination of CdSe, HgCdSe, CdS, and HgCdS.

4. The shortwave infrared ray emitting nanoparticles according to claim 1, wherein the intermediate layer includes HgS, HgSeS, or any combination of HgS, and HgSeS.

5. The shortwave infrared ray emitting nanoparticles according to claim 1, wherein the outer layer includes CdS, CdZnS, ZnS, or any combination of CdS, CdZnS, and ZnS.

6. The shortwave infrared ray emitting nanoparticles according to claim 1, wherein an emission wavelength of the nanoparticles is controlled by changing a composition of the intermediate layer, a thickness of the intermediate layer, and combination of the composition and the thickness.

7. The shortwave infrared ray emitting nanoparticles according to claim 1, wherein the outer layer includes one or more layers.

8. A method for producing shortwave infrared nanoparticles, the method comprising:
    (a) synthesizing a supporting core having band gap energy of $E_1$;
    (b) forming an intermediate layer to be used as an emitting layer on the supporting core such that the intermediate layer has band gap energy of $E_2$ in a range of 0.7 eV to 1.2 eV; and
    (c) forming an outer layer having band gap energy of $E_a$ on the intermediate layer, wherein a size of the $E_2$ is smaller than a size of the $E_1$ and a size of the $E_3$, and a thickness of the intermediate layer is 0.3 nm to 1.2 nm.

9. The method for producing shortwave infrared nanoparticles according to claim 8, further comprising performing separation and purification after any one or more of the steps (a) to (c).

* * * * *